(12) United States Patent
Yan et al.

(10) Patent No.: US 10,406,637 B2
(45) Date of Patent: Sep. 10, 2019

(54) WELDING WIRE, USAGE OF WELDING WIRE AND METHOD OF MANUFACTURING POWER TOWER

(75) Inventors: Jie Yan, Kunshan (CN); Xiangui Cao, Kunshan (CN); Fuhu Chen, Kunshan (CN); Mingqian Yang, Kunshan (CN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 389 days.

(21) Appl. No.: 13/503,129

(22) PCT Filed: Oct. 20, 2010

(86) PCT No.: PCT/IB2010/054750
§ 371 (c)(1),
(2), (4) Date: Apr. 20, 2012

(87) PCT Pub. No.: WO2011/048558
PCT Pub. Date: Apr. 28, 2011

(65) Prior Publication Data
US 2012/0205346 A1    Aug. 16, 2012

(30) Foreign Application Priority Data

Oct. 21, 2009   (CN) .......................... 2009 1 0208211

(51) Int. Cl.
*B23K 9/00*  (2006.01)
*B23K 35/02* (2006.01)
(Continued)

(52) U.S. Cl.
CPC ........ *B23K 35/362* (2013.01); *B23K 35/3073* (2013.01); *B23K 35/3607* (2013.01); *B23K 35/3608* (2013.01); *Y10T 428/12222* (2015.01)

(58) Field of Classification Search
CPC ............ B23K 35/3607; B23K 35/3608; B23K 35/3073; B23K 35/362; B23K 35/306; Y10T 428/12222
(Continued)

(56) References Cited

U.S. PATENT DOCUMENTS 3,328,212 A * 6/1967 Coless ............... B23K 35/3053
148/24
3,551,217 A * 12/1970 Coless ............... B23K 35/3602
148/26

(Continued)

FOREIGN PATENT DOCUMENTS

CN    1117902 A   3/1996
CN    1358605 A   7/2002

(Continued)

OTHER PUBLICATIONS

Su, Shengyun; Abrasion-proof pile-up welding flux-cored wire for roll squeezer; Oct. 2007; Espacenet; 6 pages.*

(Continued)

*Primary Examiner* — Dana Ross
*Assistant Examiner* — Kuangyue Chen
(74) *Attorney, Agent, or Firm* — McAndrews, Held & Malloy, Ltd.

(57) ABSTRACT

A welding wire is provided with a hollow section for accommodating flux. The flux has a composition including: Mn: 5-20%, Si: 1-15%, TiO2: 5-25%, SiO2: 0.1-10%, Mo: 0.1-5% by weight, the balance being iron. When welding low alloy high strength steel by using the welding wire, the slag on the welding bead can be easily cleaned and a smooth surface can be formed on the welding bead which makes it easier to galvanize a zinc layer over the surface of the welding bead. The welding wire provides better welding operation performance and generates less welding spatters.

42 Claims, 8 Drawing Sheets

(51) Int. Cl.
 *B23K 35/362* (2006.01)
 *B23K 35/30* (2006.01)
 *B23K 35/36* (2006.01)

(58) Field of Classification Search
 USPC ... 219/146.1, 146.23, 146.24, 146.3, 146.31, 219/74; 428/544–560; 228/112.1–124.7
 See application file for complete search history.

(56) References Cited

U.S. PATENT DOCUMENTS

| | | | |
|---|---|---|---|
| 3,721,797 A * | 3/1973 | Arikawa et al. | B23K 9/035 428/557 |
| 4,003,210 A * | 1/1977 | Bostroem | F16L 1/026 138/149 |
| 4,219,717 A * | 8/1980 | Kuhnen | 219/61 |
| 4,954,682 A * | 9/1990 | Baran | B05B 13/0618 219/59.1 |
| 6,835,913 B2 * | 12/2004 | Duncan et al. | 219/137 WM |
| 6,863,748 B2 * | 3/2005 | Zervoudis et al. | 148/441 |
| 7,193,338 B2 * | 3/2007 | Ghali | 307/147 |
| 7,491,910 B2 * | 2/2009 | Kapoor et al. | 219/146.23 |
| 2001/0030181 A1 * | 10/2001 | Kim | 219/145.22 |
| 2003/0015257 A1 | 1/2003 | Kim et al. | |
| 2004/0169026 A1 * | 9/2004 | Chen | B23K 35/0266 219/146.1 |
| 2006/0186103 A1 * | 8/2006 | Rajan | 219/145.22 |
| 2007/0237975 A1 * | 10/2007 | Park | H01F 3/08 428/546 |
| 2009/0045172 A1 * | 2/2009 | Van Erk | 219/61 |
| 2009/0148610 A1 * | 6/2009 | Nishimori | B05D 7/16 427/386 |
| 2009/0242536 A1 * | 10/2009 | Nagashima et al. | 219/145.22 |

FOREIGN PATENT DOCUMENTS

| | | | |
|---|---|---|---|
| CN | 1240516 C | | 2/2006 |
| CN | 101062533 A | * | 10/2007 |
| JP | 52115754 A | | 9/1977 |
| JP | 61283493 A | | 12/1986 |
| JP | 09155588 A | * | 6/1997 |
| JP | 2007153269 A | | 6/2007 |
| KR | 20020050438 A | * | 6/2002 |

OTHER PUBLICATIONS

International Search Report corresponding to PCT/IB2010/054750, dated Apr. 21, 2011.

* cited by examiner

WELDING WIRE, USAGE OF WELDING WIRE AND METHOD OF MANUFACTURING POWER TOWER

RELATED APPLICATIONS

The present application is a National Phase of International Application Number PCT/IB2010/054750, filed Oct. 20, 2010, and claims priority from, Chinese Application Number 200910208211.3, filed Oct. 21, 2009.

BACKGROUND

The invention relates to welding wire, and particularly to welding wire for welding low-alloy high-strength steel, and more particularly to welding wire for welding low-alloy high-strength steel for the construction of electric towers.

The electric towers (electric power steel towers) are widely used in setting up long-distance high-voltage electric cables for transmitting high-voltage, for example, higher than 100 kV. In setting up the high-voltage electric cables, there is a required height to the electric tower, because the lowest height is decided by the span of the high-voltage electric cables between two the electric towers and by the ground clearance height of the high-voltage electric cables.

For a long time, the electric towers are constructed by using low-strength steel and there are no coating layers on the surfaces of the electric towers. However, in 2008 the large-area snow damage was occurred in the south of China and the long duration of the snow disaster caused aggregation of ice on the electric cables. The thickest icecap on the electric cables even exceeded 50 mm Many electric towers were finally collapsed by the tension of the electric cables and the pressure produced by the icecap on them, which in turn caused the break of electricity transmission and brought severe difficulty to human life. The specialists later analyzed the causes of the collapse and found that one of the causes was that the load capacity of the electric towers in the south of China became too weak to sustain the load of the electric towers when the cables were frozen with icecaps. To enhance the capability against disaster (including snow disaster), there is a need to improve the load capacities of the electric towers.

China is now planning to establish large energy bases, that is, to generate large amount of electric power by selecting solar, wind power or nuclear energy in suitable areas and to transmit the electric power from the large energy bases to other locations that use the electric power. These large energy bases may be far away from the locations that use the electric power. It is known that the higher the transmitting voltages are, the longer the transmitting distances are. To increase transmitting distances of the electric power, the method of raising transmitting voltages is commonly used. The problem associated with raising transmitting voltages is that it can adversely affect the environment in transmitting the electric energy; especially the radiation generated may have negative effect on the health of human beings. Thus, when transmitting electric power with high voltages and ultra-high voltages, the distance between the electric cables and the ground is required to be longer to avoid negative effect to human beings, thus requiring electric powers sufficiently high. However, the higher the electric powers are, the heavier the loads are, which in turn requires higher load capacity to electric towers. To increase the height of the electric towers, it requires the components, from which the electric towers are assembled, to have higher load capacity.

In addition, to the electric towers with same height, the larger the tower base is, the lower the strength requirement to the electric tower assembly components is, because when the tower base gets larger, the electric tower assembly components can be made larger to have larger load capacity. On the other hand, when the tower base is smaller, the electric tower assembly components have to be made smaller and the strength requirement to the electric tower assembly components are higher. However, comparing with the electric tower with lager tower base, the electric tower with smaller tower base occupies less land. For decreasing land occupancy, there is also a need to increase load capacity so that the electric tower can be made smaller.

The outdoor (or field) long-term load capacity of an electric tower depends on two factors. One factor is the strength of the steel used in constructing the electric tower because when the strength of the steel is higher, the load capacity of the electric tower is larger. The other factor is the life-span of the assembly components used in constructing the electric tower. The electric towers are exposed to the environment for a long time and can be damaged by temperature, wind and precipitations in the atmosphere. After longtime use, if no protection, the steel of the electric tower can be corroded and the load capacity of the corroded steel will decrease. Thus, there are two ways to increase the load capacity of an electric tower. One is to use low-alloy high-strength steel as construction materials and the other is to put coatings such as galvanization on the surfaces of the assembly components that construct electric tower, to prevent the damage and corrosion to the electric tower. Because the conventionally used materials and methods for constructing electric towers cannot meet the requirements due to the development of the electric industry, there is a need to use low-alloy high-strength steel (such as Q420 steel) to construct electric towers with the requirement to galvanize the surfaces of the electric tower assembly components.

Conventionally, the electric industry uses solid welding wire to weld electric tower assembly components. After observing and researching the conventional method and technology of constructing the electric towers, the inventors of the present invention found they have at least two shortcomings by using solid welding wire to weld low-alloy high-strength steel assembly components. One shortcoming is that many welding slags are firmly bonded at the welding beads (or selding seams). It is difficult and time consuming to clean the welding slags and grind the welding beads. The other shortcoming is that even after cleaning the welding slags and grinding the welding beads, they are still rough and not smooth. It is difficult and costly to galvanize the welding beads and the quality of the galvanizing coatings on the welding beads is not good. Moreover, it is very difficult to make the thickness of the coatings on the welding beads consistent with that on the adjacent steel surfaces.

BRIEF DESCRIPTION

One of the objectives of the invention is to overcome the shortcomings in the existing technology. To that end, a welding wire is provided that is suitable for cleaning welding slags on the welding heads (or welding seams) and for coating protection layers on the surfaces of the welded components.

To achieve the above objectives, the present invention provides the following technical solution:

A welding wire, comprising an enclosed round-shaped shell having a hollow section in the welding wire; and the hollow section in the welding wire accommodating flux, the flux containing a composition including: Mn: 5%-20%; Si: 1%-15%; $TiO_2$: 5%-25%; $SiO_2$: 0.1%-10%; Mo: 0.1%-5% by weight; the remaining being iron.

An embodiment of the present invention is that the flux also includes Mg: 1%-5%; Al: 1%-5% by weight.

Another embodiment of the present invention is that the total weight amount of Mn, Si, $TiO_2$, $SiO_2$, Mo, Mg and Al is 20%-40% in the flux.

Another embodiment of the present invention is that the material of the welding wire is low-carbon steel.

Another embodiment of the present invention is that the weight of the flux is 10%-25% by weight in the welding wire.

Another one of the objective of the present invention is to provide welding wire suitable to weld high-strength steel.

Another objective of the present invention is to provide methods of using the welding wire in gas shielding arc welding.

Another objective of the present invention is to provide a welding wire for welding low-alloy high-strength steel, wherein the surfaces of the low-alloy high-strength steel and the welding bead need to be coated with a protection layer that can form the dense oxide, the welding wire comprising:

an enclosed round-shaped shell having a hollow section in the welding wire; and the hollow section of the welding wire accommodating flux that facilitates cleaning the welding slags at the welding beads (or welding seams) of the low-alloy high-strength steel.

An embodiment of the present invention is that the material of the welding wires is low-carbon steel.

Another embodiment of the present invention is that the flux contains a composition including: Mn: 5%-20%; Si: 1%-15%; $TiO_2$: 5%-25%; $SiO_2$: 0.1%-10%; Mo: 0.1%-5% by weight; the remaining is iron.

Another embodiment of the present invention is that the flux composition also includes: Mg: 1%-5%; Al: 1%-5% by weight.

Another embodiment of the present invention is that the weight amount of the Mn, Si, $TiO_2$, $SiO_2$, Mo, Mg and Al is 20%-40% of the flux weight;

Another embodiment of the present invention is that the weight of said flux is 10%-25% of the weight of the welding wire.

Another embodiment of the present invention is that the low-alloy high-strength steel is Q345, Q390, Q420 or Q460 steel.

Another embodiment of the present invention is that the welding beads on the low-alloy high-strength steels are suitable for coating a protection layer on which dense oxide can be formed; wherein the protection layer is zinc, the welding beads contain silicon to facilitate galvanizing the zinc protection layer.

Another embodiment of the present invention is that the protection layer on which the dense oxide can be formed is zinc, and the welding beads contain 0.1%-0.4% silicon by weight to facilitate galvanizing the zinc protection layer.

Another embodiment of the present invention is to provide methods to weld low-alloy high-strength steel by using gas shielding arc welding.

Another objective of the present invention is to provide a welding wire for welding the assembly components made from low-alloy high-strength steel for constructing of electric tower, wherein the assembly components need to be coated with a protection layer on which dense-oxide can be formed, the welding wire comprising:

an enclosed round-shaped shell having a hollow section; and wherein the hollow section of the welding wire accommodates flux that facilitates cleaning welding slags at the welding beads on the assembly components made from the low-alloy high-strength steel.

An embodiment of the present invention is that the material of the welding wires is low-carbon steel.

Another embodiment of the present invention is that the flux contains a composition including: Mn: 5%-20%; Si: 1%-15%; $TiO_2$: 5%-25%; $SiO_2$: 0.1%-10%; Mo: 0.1%-5% by weight; the remaining being iron.

Another embodiment of the present invention is that the flux composition also includes: Mg: 1%-5%; Al: 1%-5% by weight.

Another embodiment of the present invention is that the total weight amount of the Mn, Si, $TiO_2$, $SiO_2$, Mo, Mg and Al is 20%-40% of the flux weight.

Another embodiment of the present invention is that the weight of the flux is 10%-25% of the weight of the welding wire.

Another embodiment of the present invention is that the low-alloy high-strength steel is Q345, Q390, Q420 or Q460 steel.

Another embodiment of the present invention is that the welding heads of the assembly components are suitable for coating a protection layer on which dense oxide can be formed; and the protection layer on which the dense oxide can be formed is zinc, and the welding beads contain silicon to facilitate galvanizing the zinc protection layer.

Another embodiment of the present invention is that the protection layer on which the dense oxide can be formed is zinc, and the welding beads contain 0.1%-0.4% silicon by weight to facilitate galvanizing the zinc protection layer that has smooth and shining surface after cleaning.

Another embodiment of the present invention is to weld low-alloy high-strength steel by using gas shielding arc welding.

Another objective of the present invention is to provide a method for constructing an electric tower that is assembled by assembly components made from low-alloy high-strength steel, wherein the assembly components need to be galvanized with a zinc protection layer that can form dense oxide, comprising the steps of:

providing a welding wire for welding the assembly components, wherein the welding wire comprise an enclosed round-shaped shell made from low-carbon steel, wherein the shell has a hollow section for accommodating flux that facilitates cleaning the slags on the welding beads (or welding seams) of the assembly components and that facilitates galvanizing a zinc layer on the welding beads (or welding seams) and the adjacent steel of the assembly components;

using the welding wire of the present invention to weld the assembly components made from low-alloy high-strength steel;

cleaning the slags on the welding beads (or welding seams) in the assembly components and galvanizing a zinc layer on the assembly components; and constructing the assembly components into an electric tower in the filed.

An embodiment of the present invention is that the material of the welding wire is low-carbon steel.

Another embodiment of the present invention is that the flux contains a composition including: Mn: 5%-20%; Si:

1%-15%; $TiO_2$: 5%-25%; $SiO_2$: 0.1%-10%; Mo: 0.1%-5% by weight; the remaining being iron.

Another embodiment of the present invention is that the flux composition also includes Mg: 1%-5%; Al: 1%-5% by weight.

Another embodiment of the present invention is that the total weight amount of the Mn, Si, $TiO_2$, $SiO_2$, Mo, Mg and Al is 20%-40% of the weight of the flux.

Another embodiment of the present invention is that the weight of the flux is 10%-25% of the weight of the welding wire.

Another embodiment of the present invention is that the low-alloy high-strength steel is Q345, Q390, Q420 or Q460 steel.

Another embodiment of the present invention is that the welding beads are suitable for being coated with a protection layer on which the dense oxide can be formed. More specifically, the welding beads contain 0.1%-0.4% silicon by weight to facilitate galvanizing the zinc protection layer.

Another embodiment of the present invention is that the protection layer on which the dense oxide can be formed is zinc, and the clearance and smoothness of the welding beads are suitable for being galvanized. More specifically, the welding beads contain 0.1%-0.4% silicon by weight to facilitate galvanizing the zinc protection layer.

Another embodiment of the present invention is that the welding wire is used in gas shielding arc welding.

Comparing with the existing technology, when welding the low-alloy high-strength steel with the welding wire of the present invention, the technical properties are excellent with almost no welding spatters. Therefore, it is easier to clean welding slags on welding beads (or welding seams), form the smooth and shining surfaces on welding beads (or welding seams) and galvanize zinc. Also the welding wire of the present invention provides better welding operational properties, such as generating less welding spatters in welding process.

DRAWINGS

DETAILED DESCRIPTION

Detailed descriptions will be given below with references to the figures and embodiments.

In the present time, there are two types of electric towers. One type is angle steel electric tower, which is constructed by assembly components including bases, angle steels (not shown) and angle steel connectors (as shown in FIG. 1B). These assembly components in the angle steel electric tower are connected together by screw bolts and screw nuts. The other type is steel pipe electric tower, which is constructed by assembly components including bases, steel pipes and steel pipe connectors (as shown in 2). These assembly components in the steel pipe electric tower are also connected together by screw bolts and screw nuts.

Figure 1A:
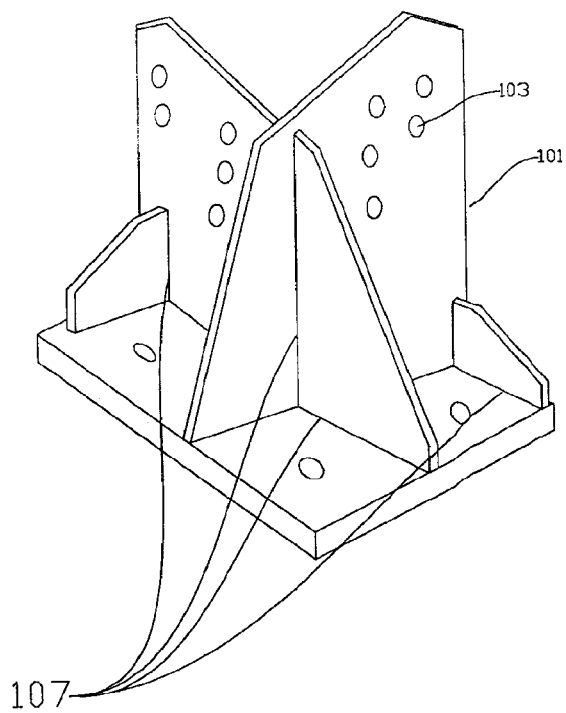
FIG. 1A is a schematic view of electric tower base.
Figure 1B:
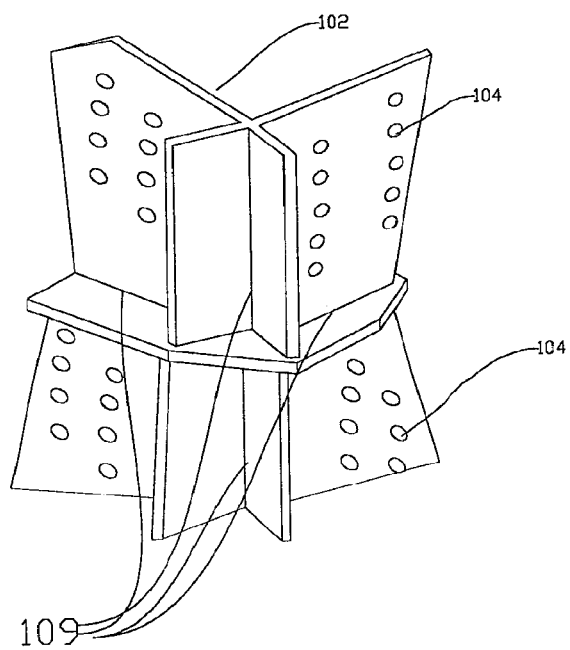
FIG. 1B is a schematic view showing the structure of angle steel connector.

FIG. 1A and FIG. 1B are the schematic views of some assembly components for constructing the angle steel electric tower. FIG. 1A is a schematic view of a base 101 of angle steel electric tower, FIG. 1B is a schematic view showing the structure of a steel angle connector 102. Both the base 101 and angle steel connector 102 are welded by a plurality of steel plates. There are a plurality of screw holes 103 on the base 101 and plurality of screw holes 104 on the angle steel connector 102. Both of the screw holes 103 and the screw holes 104 are matched with the screw holes on the angle steels which are connected together with the base 101 or the angle steel connector 102 by screw blots and screw nuts. A plurality of the bases, angle steel connectors and angel steels can be assembled together by screw blots and screw nuts to form an electric power steel tower (i.e., electric tower). The bases and the angle steel connectors are welded and then galvanized in advance. Similarly, the angle steels are galvanized in advance. Then these galvanized bases, the angle steel connectors and angle steels are assembled together to construct an electric tower in a construction filed. Higher is the electric tower, more assembly components (including bases, angle steel connectors and angle steels) are used. In FIG. 1A, there are shown a plurality of welding beads (or welding seams) 107 on the base 101 (not all the welding beads are shown in the figure); in FIG. 1B, there are shown welding beads (seams) 109 on the angle steel connectors 102 (not all the welding beads are shown in the figure). Welding process always generates welding beads (or welding seams). As shown in FIG. 1A, the steel plates which form the base are mostly arranged to be perpendicular with each other and are welded at the contact positions of two steel plates. As shown in FIG. 1B, the steel plates which form the angle steel connector are also set to be perpendicular to each other and they are also welded at the contact positions of two steel plates. Thus, the welding beads (or welding seams) are mainly located at contact corners of two steel plates and it is very inconvenient to clean the welding slags and polish the surfaces of the welding beads (or welding seams).

Figure 2:
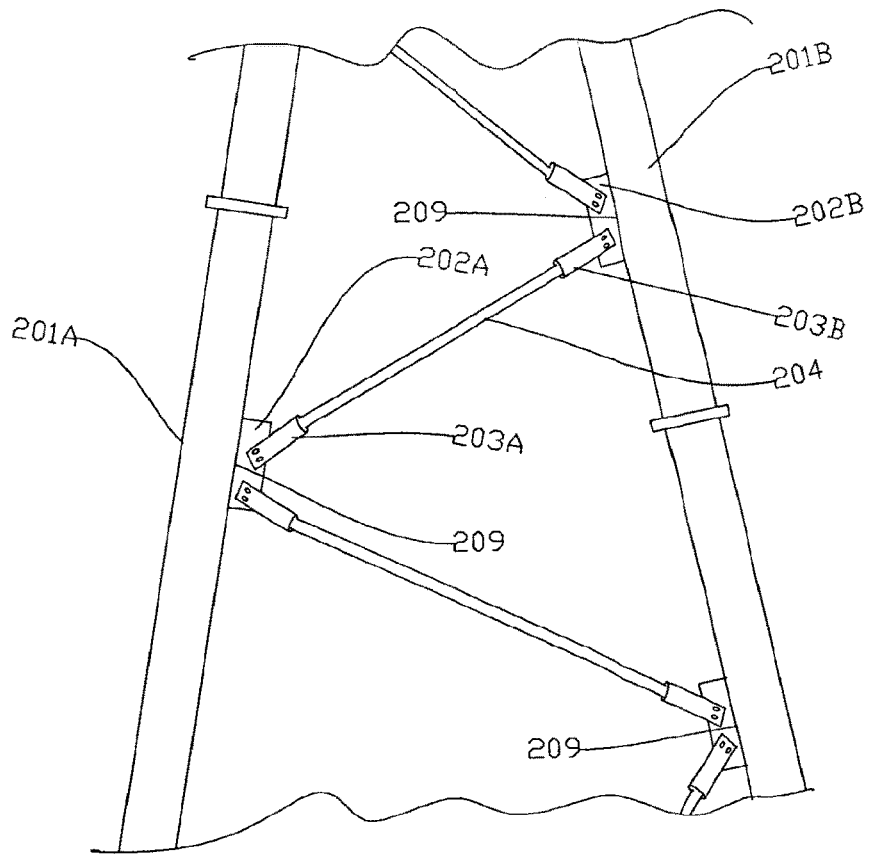
FIG. 2 is a partial schematic view showing the structure of steel pipe electric tower.

FIG. 2 is a partial schematic view showing the structure of steel pipe tower. A plurality of steel pipe connectors are welded onto the main steel pipes 201 (201A, 201B . . . ). The steel pipe connectors comprise the casing pipe holders 202 (202A, 202B . . . ) and the casing pipes 203 (203A, 203B . . . ). The casing pipe holders 202A are welded on the main steel pipes 201A. The casing pipes 203A are connected with the casing pipe holders 202A by screw blots and screw nuts. When constructing the steel pipe tower, the bases (not shown), the main steel pipes and the steel pipes are assembled together in the construction field by crew blots and screw nuts. The casing pipe 203A is arranged opposite to the casing piper 203B so that the two ends of a straight steel pipe 204 can be inserted into casing pipes 203A and 203B respectively. A steel pipe tower can be assembled by a plurality of the main steel pipes, steel pipes and steel pipe connectors. The structure of the main steel pipes, steel pipe connectors, crew blots and crew nuts, steel pipes and the method of assembling them are known to a person skilled in the art, thus not being explained in detail here. In FIG. 2, there are shown welding beads (or welding seams) 209 in the schematic view of the partial structure of the steel pipe tower.

In the conventional electric tower construction method, the assembly components of an electric tower, such as bases, angle steel connectors, angle steels, steel pipes and steel pipe connectors are made in advance. All assembly components for constructing the electric tower are welded in indoor workshop in advance and then are assembled into an electric tower in construction field. Thus, all required welding operations can be performed in indoor environment. When performing welding operations in indoor workshop, the welding environment is better than that in the field. In addition, the shapes of the welding beads (or welding seams) on the welding components are relatively simple and the requirements to the operational properties of the welding wire are not high. Therefore, conventional electric tower uses regular-strength steels because it is relatively easy to clean the welding slags on the welded regular-strength steels. In addition, in the conventional method, there is no requirement to galvanize the surfaces of the welding beads (or welding seams). For these reasons, the solid welding wires can meet with the requirements to weld assembly components for conventional electric tower. Therefore, solid welding wires are conventionally used to make assembly components for constructing electric towers.

When high-strength steels (such as Q345, Q390, Q420 or Q460 steel) are used to make assembly components for constructing electric towers, it is very difficult to clean welding slags on welding beads (or welding seams) when using the conventionally used solid welding wires. In addition, the future electric towers are possibly required to be galvanized. Without clearly cleaning slags, the quality of galvanizing zinc on the welding beads (or welding seams) will be negatively affected. Because solid welding wires are formed by directly pulling (or drawing) steel wires that are produced by steel plants, it is very limited (if not possible) to adjust the compositions in the steel wires during their production process. Therefore, the conventionally used solid welding wires are unable to solve the difficulty in cleaning slags on welding heads and galvanizing zinc layer on the welding heads. The existing flux-cored welding wires are also unable to solve the difficulty in cleaning slags on welding beads and galvanizing zinc layer on the welding beads. The inventors of the present invention noticed because flux-cored welding wire contain flux in its core, it has a wider range to adjust the compositions in the flux. By adjusting the flux compositions in the flux-cored welding wires, the present invention solves the problem to clean slags on welding beads and galvanize zinc layer on the welding beads, which is caused by using high-strength steels to construct electric tower.

FIGS. 3-6 are the schematic views illustrating the structure and manufacturing method of the welding wire for welding low-alloy high-strength steels according to the present invention.

Figure 3:
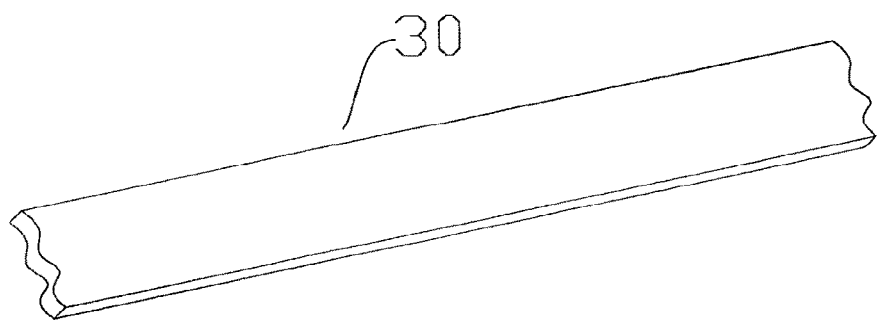
FIG. 3 is a schematic view of the steel strip for making the welding wires with flux core which is used to weld low-alloy high-strength steel according to the present invention.

FIG. 3 is a schematic view of steel strip 30 used in the present invention to make the flux-cored welding wires for welding low-alloy high-strength steel. In the present invention, the steel strip is low-carbon steel and all the low-carbon steel on the market can be used here. Preferably, the composition of the low-carbon steel by weight: C: 0.02-0.05% can meet the need.

Preferably, the other composition in the low-carbon steel is: Si: 0.005-0.02%; Mn: 0.2-0.4%; S<0.01%; P<0.02% by weight; the remaining is iron and other microelements.

Figure 4:
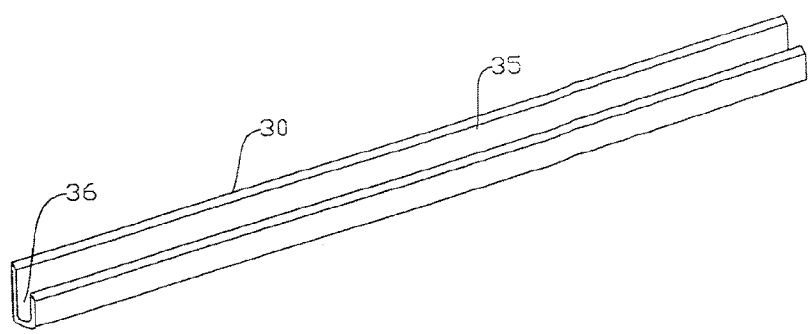
FIG. 4 is a schematic view of the steel strip as shown in FIG. 3, which is shaped as U shape with an opening in the top.

As shown in FIG. 4, to wrap the flux in the welding wire, the steel strip 30 is initially shaped as U-shape with an opening 35 so that flux can be put into the U-shaped groove 36.

The flux includes: Mn: 5%-20%; Si: 1%-15%; $TiO_2$: 5%-25%; $SiO_2$: 0.1%-10%; Mo: 0.1%-5% by weight; the remaining is iron.

The flux can also include Mg: 1%-5%; Al: 1%-5% by weight.

A preferred embodiment is that the total weight amount of Mn, Si, $TiO_2$, $SiO_2$, Mo, Mg and Al is 20%-40% of the total weight of the flux.

The weight of the flux is 10%-25% of the total weight of the welding wire.

The compositions mentioned above (Mn, Si, $TiO_2$, $SiO_2$, Mo, Mg and Al) can be individually added into the flux and can also be added into the flux in combination between or among any of them.

Figure 5:
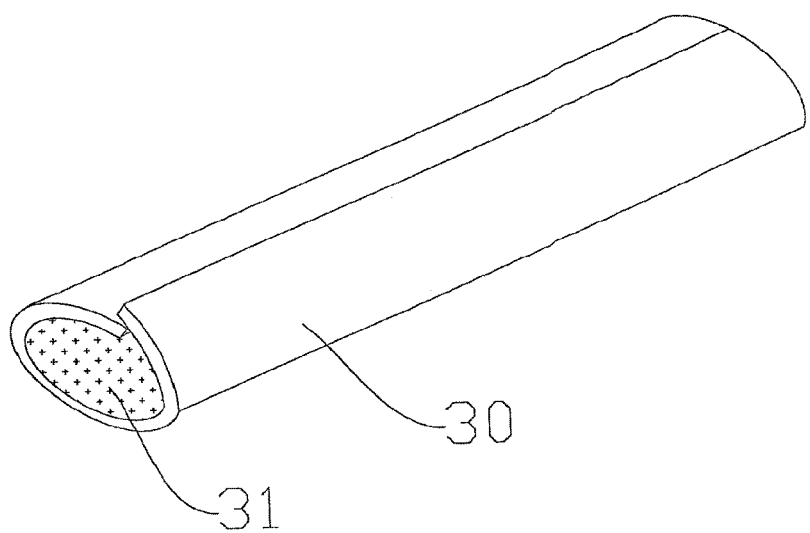
FIG. 5 is a schematic view showing the structure of the U-shaped steel strip in which its opening is enclosed.
Figure 6A:
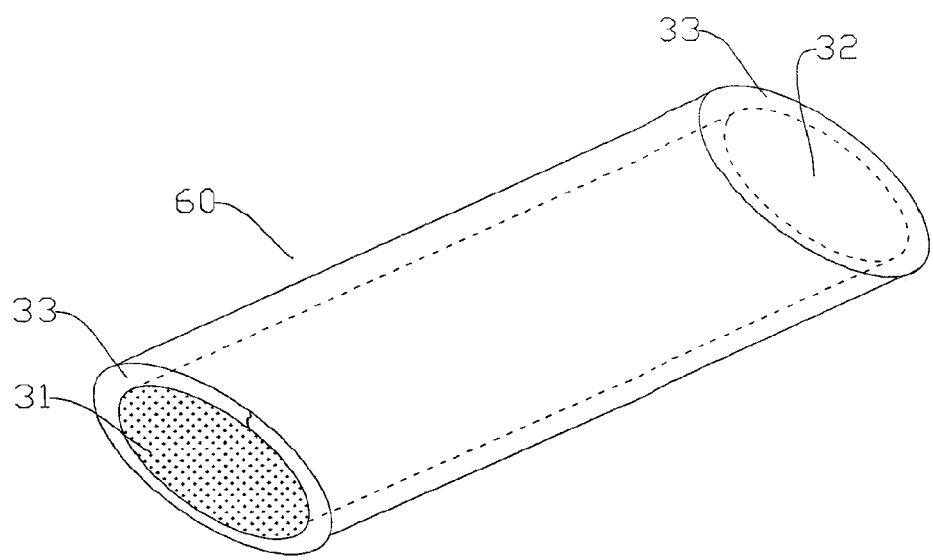
FIG. 6A is a schematic view showing the structure of the welding wire according to the present invention.
Figure 6B:
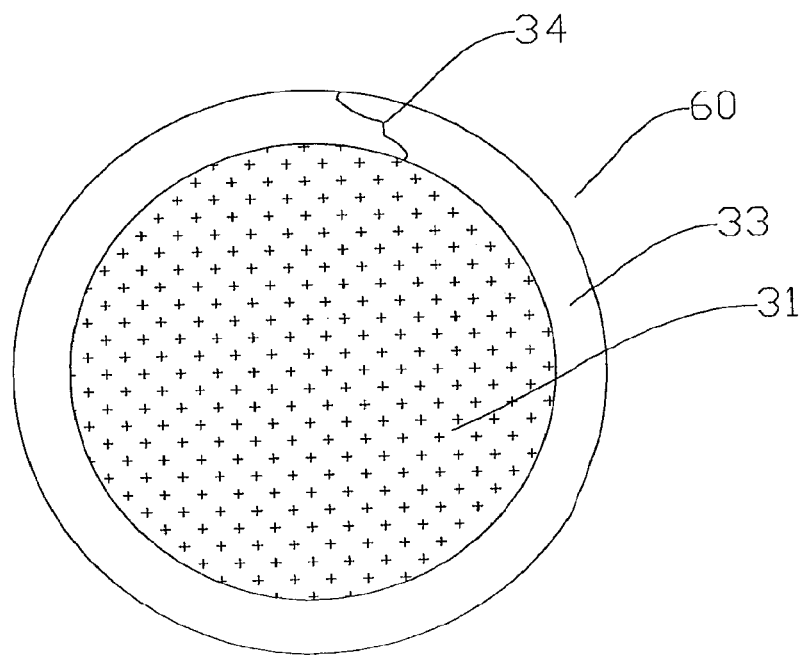
FIG. 6B is a sectional view of the welding wire according to the present invention.

As shown in FIG. 5, the opening 35 of the U-shaped groove 36 is enclosed to be a round shape. The flux 31 is wrapped inside of the steel strip 30. The steel strip 30 shown in FIG. 5 is then pulled in drawing machine so that the enclosed steel strip 30 becomes round shaped to form a round-shaped shell 33 as shown in FIGS. 6A and 6B. The flux 31 is wrapped in the middle portion of the welding wire 60. As shown in FIG. 6A, the welding wire 60 has a hollow section 32 that is enclosed by shell 33 along its axial direction for receiving the flux, and the flux 31 is evenly distributed in the the hollow section 32 along the axial direction of the welding wire 60. In one embodiment, the diameter of the flux-cored welding wire is 1.4 mm after being drawn in the drawing machine. The diameter of the flux-cored welding wire can be varied according to practical requirements, such as 1.6 mm or 1.2 mm.

FIG. 6B is a sectional view showing the welding wire 60 after being pulled by the drawing machine, in which the flux 31 is wrapped in the middle portion of the welding wire 60. The outer material of the welding wire is the steel strip 30 as shown in FIG. 5. As shown in FIG. 6, the cross-section of the welding wire 60 shows a lap joint section 34 on the shell 33.

The compositions of the flux by weight in illustrative embodiments 1-27 are shown in Table 1 as follows:

Difficult to polish; and
Low quality of galvanization.

TABLE 1

| Embodiment | Comosistion percentage by wieght in flux | | | | | | | | Flux percentage by weight in welding wire |
|---|---|---|---|---|---|---|---|---|---|
| | Mn | Si | Al | Mg | Mo | TiO$_2$ | SiO$_2$ | Fe | |
| 1 | 11.5% | 15% | | | 3.2% | 10.5% | 2.8% | remaining | 10.5% |
| 2 | 12.5% | 13.5% | 1% | | 3.5% | 5.4% | 0.4% | remaining | 13.4% |
| 3 | 13% | 12.5% | | | 3.5% | 3.0% | 1.5% | remaining | 12.5% |
| 4 | 15% | 8% | 1.4% | 1.8% | 3.5% | 2.6% | 3.2% | remaining | 11.7% |
| 5 | 13% | 10.5% | | | 3.5% | 6.7% | 4.9% | remaining | 16.8% |
| 6 | 14% | 13.6% | 1% | | 3.5% | 5.5% | 0.4% | remaining | 15.4% |
| 7 | 17% | 9.3% | | | 3.5% | 16.3% | 0.2% | remaining | 17% |
| 8 | 13.5% | 11.5% | 2.83% | 3.67% | 3.5% | 12% | 6.4% | remaining | 14% |
| 9 | 15% | 10% | | | 3.5% | 4% | 2% | remaining | 13% |
| 10 | 12.5% | 5% | 1% | | 3.5% | 2.3% | 0.4% | remaining | 24.3% |
| 11 | 12.5% | 9.5% | 1% | | 3.5% | 5.6% | 0.4% | remaining | 22% |
| 12 | 15.5% | 2% | 1.89% | 2.44% | 3.5% | 14% | 4.2% | remaining | 25% |
| 13 | 10% | 8.6% | | | 3.5% | 9.1% | 3.5% | remaining | 10% |
| 14 | 5% | 1% | | 2.5% | 0.2% | 5% | 0.5% | remaining | 11% |
| 15 | 10% | 5% | 2% | 2% | 0.5% | 5% | 8% | remaining | 10.5% |
| 16 | 15% | 9.8% | 3% | 4% | 3.5% | 18% | 8% | remaining | 24.5% |
| 17 | 6% | 7% | 1% | 1.5% | 1.5% | 7% | 2% | remaining | 23.2% |
| 18 | 6% | 1.5% | 2.3% | 3.2% | 2.4% | 14.3% | 7.2% | remaining | 12.3% |
| 19 | 5.5% | 9.4% | 2.6% | 2.7% | 3.1% | 15.2% | 6.3% | remaining | 14.7% |
| 20 | 5.8% | 9.6% | 1.1% | 3.3% | 2.8% | 16% | 6.8% | remaining | 15.4% |
| 21 | 5.2% | 8.6% | 2.5% | 1.3% | 3% | 9% | 6% | remaining | 18.9% |
| 22 | 5.1% | 8.2% | 2.0% | 2% | 1% | 9% | 6% | remaining | 21% |
| 23 | 5.1% | 7.3% | 2.0% | 2% | 3% | 5% | 7% | remaining | 20% |
| 24 | 5.1% | 6.3% | 2.0% | 2% | 3% | 11% | 0.5% | remaining | 16.3% |
| 25 | 5.3% | 2% | 2.6% | 2.7% | 2.5% | 9% | 7.2% | remaining | 15% |
| 26 | 5.4% | 1.8% | 1% | 2.5% | 2.6% | 14% | 5.2% | remaining | 23% |
| 27 | 9% | 2% | 2.1% | 3.3% | 2.8% | 16% | 6.8% | remaining | 25% |

Using the conventionally used solid welding wire (such as ER60S-G) and the flux-cored welding wire of the present invention to weld low-alloy high-strength steel, respectively, we can obtain the comparison experimental results as follows:

When welding low-alloy high-strength steels (such as Q420 steel) using the conventional solid welding wires (ER60S-G), more slags are produced during the welding process and many slags are firmly bonded at the welding beads (or welding seams) (i.e., the surface of the deposited metal), which causes difficulties for cleaning the slags and polishing the welding beads (or welding seams). Special polishing equipment, such as grinding wheel, needs to be used for cleaning and polishing the welding heads (or welding seams). Much dust is produced during the polishing process, which is harmful to the environment and health of human beings. In the galvanizing process, the surface portion of the welding beads with the slags cannot be galvanized even though the surface portion of the welding beads without slags can be galvanized. If the surface portion with slags is not galvanized, the slags become the entrances of the corrosion by the environment. Consequently, the load capacity of the electric tower as a whole is decreased due to the corrosion caused by the slags, which may in turn cause collapse of the electric tower. Even if the slags at the welding beads are cleaned, the rough and uneven surfaces on the welding beads (or welding seams) negatively affect the quality of galvanization. So the shortcomings when using the conventional solid welding wires to weld low-alloy high-strength steels (such as Q420 steel) are as follows:

Waste of manpower;
Waste of metal materials (due to polishing);
Produce noise and dust, and pollute the environment;

When welding low-alloy high-strength steels by using the conventionally used solid welding wire, the welding process is droplet transfer process, thus generating more spatters. By contrast, when welding low-alloy high-strength steels using the flux-cored welding wires of the present invention, the welding process is spray transfer process, thus generating less spatters. After completing the welding process by using the flux-cored welding wires of the present invention, only a thin layer of slags is formed on the surface of the welding beads (or welding seams), some of the slags detach from the welding beads (or welding seams) automatically, and the remaining slags are loosely bonded on the welding beads. Thus, to clean the slags, it is not necessarily to use special grinding equipment (such grinding wheel); rather, to clean the slags, it is sufficient to use simple tools to slightly scrap, brush or strike the welding beads (or welding seams). After the slags are cleaned, the surfaces of the welding heads are smooth and shinging, and can be galvanized more easily. Because of the function of flux compositions, during the welding process, about 0.1%-0.4% silicon by weight is evenly formed into the welding beads, which is helpful to galvanize a zinc layer on the surfaces of the welding beads. It is found through experiments that it is more effective to use hot dip galvanize process to coat a zinc layer on the surfaces of the welding beads (or welding seams). In the present invention, the amount of the silicon in deposited metal of the welding beads can meet both the requirements of mechanical properties of the deposited metal and the requirements to zinc galvanization.

Comparing with the conventionally used solid welding wires through experiments, to use the flux-cored welding wires in the present invention to weld low-alloy high-strength steel has the advantages as follows:

Save manpower and reduce costs;
Save metal materials;
Save welding wires;
Improve working environment;
Have smooth and shining surface on welding beads after cleaning;
Easier to clean and polish the surfaces of welding beads; and
Improve the quality of galvanization.

Through experiments, it is found that, the composition of Al and Fe in the flux, together with Ti, in the welding wires of the present invention, has contribution to make it easier to detach the slags from low-alloy high strength steels after welding process.

The welding wires of the present invention are suitable to be used in gas-shielded flux-cored arc welding (FCAW). The shielding gas can be preferable the composition of 50%-85% Ar and 15-50% $CO_2$ by volume. Alternatively, $CO_2$ can be used as the only shielding gas individually.

When using the flux-cored welding wires of the present invention, the wending specification is shown in the following Table 2:

TABLE 2

| Welding parameters | Diameter (mm) | | |
|---|---|---|---|
| | 1.2 | 1.4 | 1.6 |
| Voltage (V) | 24-32 | 25-35 | 25-38 |
| Current (A) | 140-300 | 170-350 | 200-400 |
| Electrode extension (mm) | 15-25 | 15-25 | 15-25 |
| Gas flow rate (L/min) | 20-25 | 20-25 | 20-25 |

Conducting welding cracking test on the welding surface by using the flux-cored welding wire of embodiment 21 as shown in Table 1 to weld Q420 steel, the welding parameters and the test results are shown in Table 3:

TABLE 3

| Welding wire name | Embodiment 21 | Wire specification (mm) | ∅ 1.2 | Batch No. | 90813T9X | | |
|---|---|---|---|---|---|---|---|
| Testing coupon size (mm) | 200 × 75 × 30 | Testing coupon specification | DH36 | Base gap (mm) | 2 | Slop angle | 60° |
| | | Polarity property | DC+ | Temperature (° C.) | 29 | Welding process | Automatic |
| Welding current (A) | 220 | Welding voltage (V) | 28 | Welding speed (mm/min) | 280 | Heat input (KJ/cm) | 13.20 |
| Test result | | | | | | | |
| Welding seam length (mm) | 72.2 | Total length of cracks on surface (mm) | 0 | Cracking rate on surface (%) | 0.00% | | |

Conducting test welding to weld Q420 steel by using the flux-cored welding wire according to the embodiment 12 as shown in Table 1 in a flat position welding process, the test results for the deposited metal after the welding process are shown in Table 4:

TABLE 4

Figure 8:
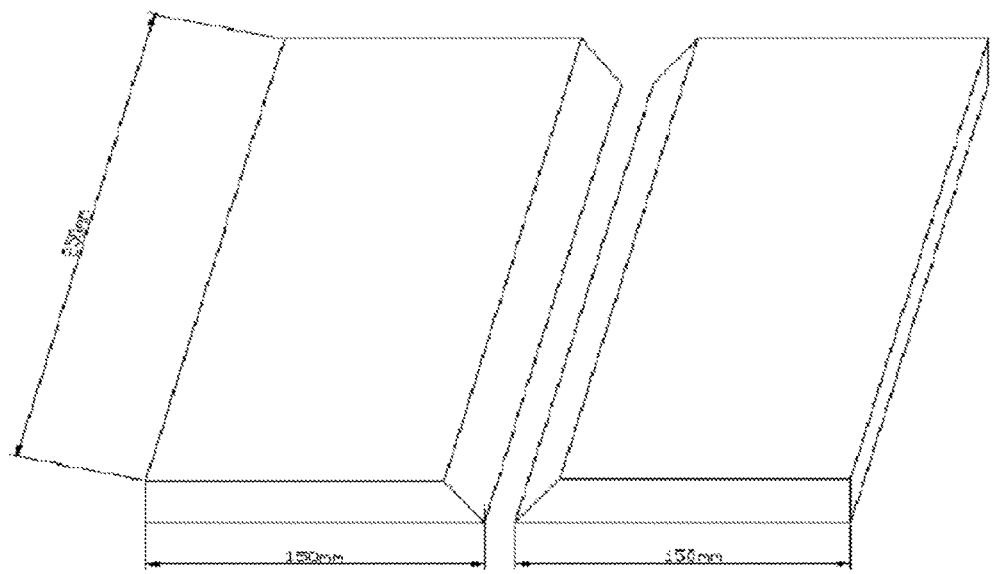
FIG. 8 is a schematic view of a test coupon according to the present invention.

| Welding process: FCAW | Manipulation type: Semi-automatic |
|---|---|
| (1) Base metal | (2) Test coupon: |
| Base metal: Q420 steel<br>Material specification<br>Type/Grade: —<br>Thickness: 16 mm<br>Baking Plate: ☐YES ■(NO) | Shown in FIG. 8. |
| (3) Welding materials | (4) Welding position |
| Specification: AWS A 5.28<br>Classification: E80C-G<br>Welding wire: Embodiment 12 | Position of Groove: flat position welding<br>Weld progression: going back<br>(5) Shelding gas |
| Diameter: 1.2 (wire diameter)<br>Batch No: 90813T8X | Gas Type: 80% Ar + 20% CO2<br>Composition: ≥99.9%<br>Flow rate: 20 L/min |
| (6) Preheat | (8) Welding Technique |
| Preheat temperature: 27° C. | String or weave: string in base, weave in filing cover surface |
| Interpass temperature: uncontrolled in continous welding | Single or multiple pass: multiple pass<br>Cleaning: grinding, konckking, brushing |
| (7) Postweld heat treatment | Others: changing elding direcion after each layer |
| Holding temperature: —<br>Holding time: — | Electrode extension: 15-20 mm |

TABLE 4-continued

Figure 9:
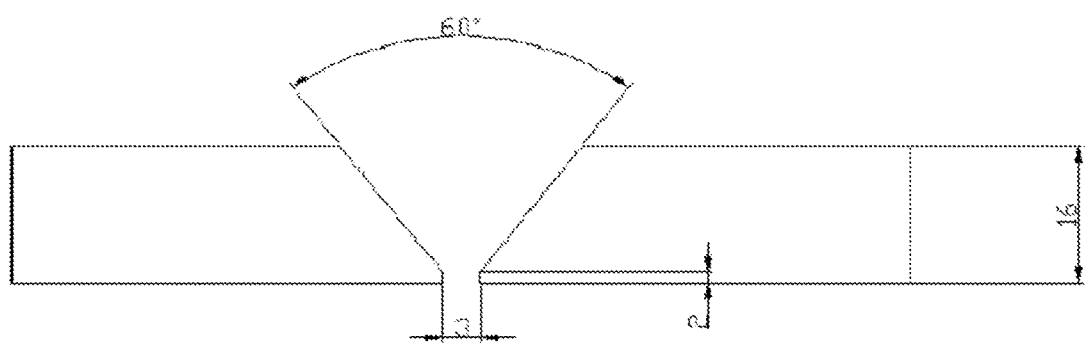
FIG. 9 is a schematic view of joint details according to the present invention.
Figure 10:
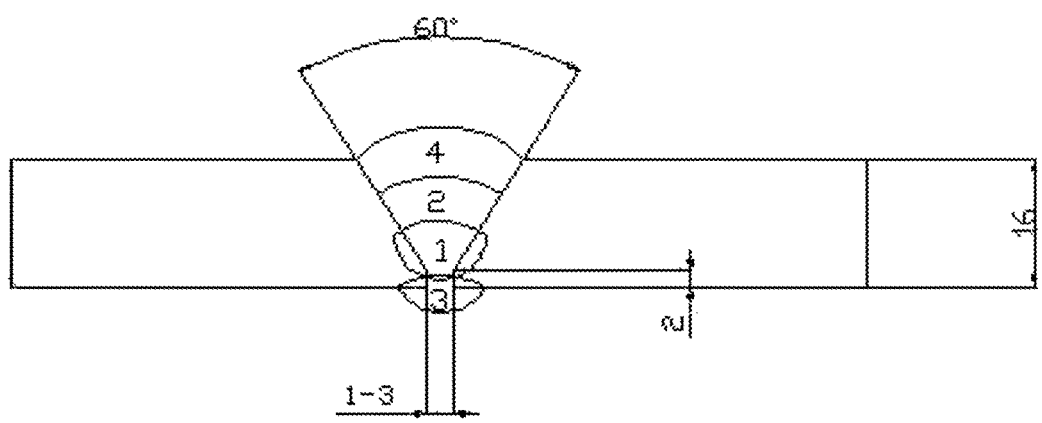
FIG. 10 is a schematic view of a pass sequence according to the present invention.

| (9) Joint details | (10) Pass sequence |
|---|---|
| Shown in FIG. 9. | Shown in FIG. 10. |

(11) Welding parameters

| Pass | Welding process | Welding current Type& Polarity | Welding current Current (A) | ARC Voltage (V) | Gas type | Gas flow rate (l/min) | Travel speed (mm/S) | Interpass temperature (° C.) | Heat input (KJ/cm) |
|---|---|---|---|---|---|---|---|---|---|
| 1 | FCAW | DC+ | 120 | 22 | Ar + $CO_2$ | 20 | 4.2 | 27 | 7.54 |
| 2 | FCAW | DC+ | 245 | 28 | Ar + $CO_2$ | 20 | 4.8 | 150 | 14.29 |
| 3 | FCAW | DC+ | 240 | 28 | Ar + $CO_2$ | 20 | 5 | 200 | 13.44 |
| 4 | FCAW | DC+ | 245 | 28.5 | Ar + $CO_2$ | 20 | 5.3 | 305 | 13.17 |

Test result

(13) Non-Destructive Test

Visual inspection result: meet standard
Radiographic test result: Grade I (GB/T 3323-2005, radiographic photo on molten metal deposit welding joint
Ultrasonic test result: —
Magnetic particle result: —

(14) Chemical constitution of deposited metal

|  | C | Mn | Si | Mo | S | P | O | N |
|---|---|---|---|---|---|---|---|---|
| E80C-G | — | — | — | — | — | — | — | — |
| Embodiment 12 | 0.052 | 1.57 | 0.352 | 0.289 | 0.013 | 0.013 | 0.086 | 0.006 |

(15) Joint tensile test

| Specimen No. | Welding wire name | Wire Diameter (mm) | E.L % | Yield strength (N/mm$^2$) | Tensile Strength (N/mm$^2$) |
|---|---|---|---|---|---|
| 90813T8X | Embodiment 12 | 1.2 | 25.5 | 490 | 595 |
|  | AWS A5.28 E80C-G |  | — | — | ≥550 |

(16) Impact test

| Notch Type: Charpy V Notch | Specimen size: 10 mm * 10 mm | Test temperature: 10° C. |

| Specimen Location | Impact absorbed energy (J) Single value | | | | | AVE.value |
|---|---|---|---|---|---|---|
| Weld metal center line | 38 | 26 | 26 | 36 | 30 | 31 |

Based on the method described in Table 4 to conduct testing welding for Q420 steel by using the flux-cored welding wires in the embodiments 1-13 shown in Table 1, the test results of the chemical composition (wt %) in the deposited metal are shown in the following Table 5:

TABLE 5

|  | C | Mn | Si | Mo | Ni | S | P | Ti |
|---|---|---|---|---|---|---|---|---|
| Embodiment 1 | 0.047 | 1.08 | 0.4 | 0.224 | 0.02 | 0.005 | 0.013 | 0.003 |
| Embodiment 2 | 0.055 | 1.01 | 0.39 | 0.227 | 0.018 | 0.007 | 0.013 | 0.011 |
| Embodiment 3 | 0.059 | 1.29 | 0.397 | 0.28 | 0.009 | 0.01 | 0.014 | 0.045 |
| Embodiment 4 | 0.064 | 1.62 | 0.197 | 0.261 | 0.012 | 0.013 | 0.009 | 0.053 |
| Embodiment 5 | 0.06 | 1.33 | 0.214 | 0.25 | 0.025 | 0.007 | 0.016 | 0.034 |
| Embodiment 6 | 0.042 | 1.49 | 0.365 | 0.286 | 0.011 | 0.013 | 0.01 | 0.041 |
| Embodiment 7 | 0.057 | 1.67 | 0.243 | 0.257 | 0.013 | 0.012 | 0.009 | 0.053 |
| Embodiment 8 | 0.048 | 1.16 | 0.226 | 0.28 | 0.017 | 0.013 | 0.009 | 0.044 |
| Embodiment 9 | 0.048 | 1.54 | 0.306 | 0.279 | 0.01 | 0.013 | 0.013 | 0.041 |

Based on the method described in Table 4 to conduct testing welding for Q420 steel by using the flux-cored welding wires in the embodiments 1-9 as shown in Table 1, the testing results of the performance of the deposited metal are shown in the following Table 6:

TABLE 6

|  | Yield strength (Mpa) | Tensile strength (Mpa) | Extension rate (%) | Impact absorbed energy |
|---|---|---|---|---|
| Embodiment 1 | 530 | 645 | 22.5 | 45J/−30° C. |
| Embodiment 2 | 595 | 660 | 22.5 | 58J/−30° C. |
| Embodiment 3 | 565 | 635 | 21 | 51J/−30° C. |
| Embodiment 4 | 550 | 630 | 23.5 | 65J/−30° C. |
| Embodiment 5 | 560 | 645 | 20.5 | 34J/−30° C. |
| Embodiment 6 | 515 | 600 | 23.5 | 40J/−30° C. |
| Embodiment 7 | 600 | 675 | 23 | 67J/−30° C. |
| Embodiment 8 | 500 | 595 | 25.5 | 58J/−30° C. |
| Embodiment 9 | 600 | 655 | 24 | 35J/−30° C. |
| Embodiment 10 | 625 | 680 | 21.5 | 39J/−30° C. |
| Embodiment 11 | 580 | 635 | 21.5 | 63J/−30° C. |
| Embodiment 12 | 625 | 670 | 21 | 55J/−30° C. |
| Embodiment 13 | 595 | 650 | 21 | 61J/−30° C. |

Using the embodiment 9 as shown in Table 1 to weld Q390 steel and Q460 steel in a flat position welding, the testing results for deposited metal after welding process are shown in the following Table 7 and Table 8, respectively:

TABLE 7

| | |
|---|---|
| Welding process: FCAW | Manipulation type: Semi automatic |
| (1) Base metal | (2) Test coupon: |
| Material specification: Q390 | Shown in FIG. 8. |
| Type/Grade: — | |
| Thickness: 16 mm | |
| Baking Plate: ☐YES ■NO | |
| (3) Welding materials | (4) Welding position |
| Specification: AWS A5.28 | Position of Groove: Flat position welding |
| Classification: E80C-G | Weld progression: going back |
| Welding wire: Embodiment 9 | (5) Shelding gas |
| Wire Diameter: 1.2 mm | Gas Type: 80% Ar + 20% $CO_2$ |
| Batch No: 90817T8X | Composition: ≥99.9% |
| | Flow rate: 20 L/min |
| (6) Preheat | (8) Welding Technique |
| Preheat temperature: 27° C. | String or weave: string in base, weave in filing cover surface |
| Interpass temperature: uncontrolled in continous welding | Single or multiple pass: multiple pass |
| | Cleaning: grinding, knocking, brushing |
| (7) Postweld heat treatment | Others: changing welding direction after each layer |
| Holding temperature: — | Electrode extension: 15-20 mm |
| Holding time: — | |
| (9) Joint details | (10) Pass sequence |
| Shown in FIG. 9. | Shown in FIG. 10. |

(11) Welding parameters

| Pass | Welding process | Welding current Type & Polarity | Welding current Current (A) | ARC Voltage (V) | Gas type | Gas flow rate (l/min) | Travel speed (mm/S) | Interpass temperature (° C.) | Heat input (KJ/cm) |
|---|---|---|---|---|---|---|---|---|---|
| 1 | FCAW | DC+ | 100 | 21 | Ar + $CO_2$ | 20 | 4.1 | 30 | 5.12 |
| 2 | FCAW | DC+ | 235 | 27 | Ar + $CO_2$ | 20 | 4.6 | 145 | 13.79 |
| 3 | FCAW | DC+ | 240 | 27 | Ar + $CO_2$ | 20 | 5 | 215 | 12.96 |
| 4 | FCAW | DC+ | 245 | 29 | Ar + $CO_2$ | 20 | 5 | 325 | 14.21 |

(12) Others

Test result

(13) Non-Destructive Test

| | |
|---|---|
| Visual inspection result: meet standard | Ultrasonic test result: — |
| Radiographic test result: Grade I (GB/T 3323-2005, radiographic photo on molten deposit joint) | Magnetic particle result: — |

(14) Chemical constitution of deposited metal

| | C | Mn | Si | Mo | S | P | O | N |
|---|---|---|---|---|---|---|---|---|
| E80C-G | — | — | — | — | — | — | — | — |
| Embodiment 9 | 0.052 | 1.29 | 0.307 | 0.242 | 0.011 | 0.015 | 0.075 | 0.006 |

(15) Joint tensile test

| Specimen No. | Welding wire name | Diameter (mm) | E.L % | Yield strength (N/mm$^2$) | Tensile Strength (N/mm$^2$) |
|---|---|---|---|---|---|
| 90817T8X | Embodiment 9 | 1.2 | 24.5 | 490 | 570 |
| | AWS A5.28 E80C-G | | — | — | ≥550 |

(16) Impact test

| Notch Type: Charpy V Notch | Specimen size: 10 mm * 10 mm | Test temperature: −40° C. |
|---|---|---|

| | Impact absorbed energy (J) | | | | | |
|---|---|---|---|---|---|---|
| Specimen Location | Single value | | | | | AVE. value |
| Weld metal center line | 40 | 28 | 36 | 38 | 38 | 36 |

TABLE 8

| | |
|---|---|
| Welding process: FCAW | Manipulation type: Semi automatic |
| (1) Base metal | (2) Test coupon: Shown in FIG. 8. |
| Material specification: Q460 Steel<br>Type/Grade: —<br>Thickness: 16 mm<br>Baking Plate: ☐YES ■NO | |
| (3) Welding materials | (4) welding position |
| Specification: AWS 5.28<br>Classification: E80C-G<br>Welding wire: Embodiment 9 | Position of Groove: flat position welding<br>Weld progression: going back<br>(5) Shelding gas |
| Wire Diameter: 1.2<br>Batch No: 90824T8X | Gas Type: 80% Ar + 20% $CO_2$<br>Composition: ≥99.9%<br>Flow rate: 20 L/min |
| (6) Preheat | (8) Welding Technique |
| Preheat temperature: 27° C.<br>Interpass temperature: uncontrolled in continous welding | String or weave: string in base, weave in filing cover surface<br>Single or multiple pass: multiple pass<br>Cleaning: grinding, knocking, brushing |
| (7) Post weld heat treatment | Others: changing welding direction after each pass |
| Holding temperature: —<br>Holding time: — | Electrode extension: 15-20 mm |
| (9) Joint details | (10) Pass sequence |
| Shown in FIG. 9. | Shown in FIG. 10. |

(11) Welding parameters

| Pass | Welding process | Welding current Type & Polarity | Welding current Current (A) | ARC Voltage (V) | Gas type | Gas flow rate (l/min) | Travel speed (mm/S) | Interpass temperature (° C.) | Heat input (KJ/cm) |
|---|---|---|---|---|---|---|---|---|---|
| 1 | FCAW | DC+ | 90 | 20 | Ar + $CO_2$ | 20 | 4.5 | 27 | 4.0 |
| 2 | FCAW | DC+ | 230 | 27 | Ar + $CO_2$ | 20 | 4.8 | 150 | 12.93 |
| 3 | FCAW | DC+ | 245 | 28 | Ar + $CO_2$ | 20 | 4.5 | 200 | 15.24 |
| 4 | FCAW | DC+ | 240 | 29 | Ar + $CO_2$ | 20 | 5.2 | 305 | 13.38 |

(12) Others

Test result

(13) Non-Destructive Test

| | |
|---|---|
| Visual inspection result: meet standard | Ultrasonic test result: — |
| Radiographic test result: Grade I, BB/T 3323-2005, radiographic photo on molten metal deposit joint | Magnetic particle result: — |

(14) Chemical constitution of deposited metal

| | C | Mn | Si | Mo | S | P | O | N |
|---|---|---|---|---|---|---|---|---|
| E80C-G | — | — | — | — | — | — | — | — |
| Embodiment 9 | 0.048 | 1.54 | 0.285 | 0.279 | 0.013 | 0.013 | 0.068 | 0.006 |

(15) Joint tensile test

| Specimen No. | Welding wire name | Wire diameter (mm) | E.L % | Yield strength (N/mm$^2$) | Tensile Strength (N/mm$^2$) |
|---|---|---|---|---|---|
| 90824T8X | Embodiment 9 | 1.2 | 23 | 530 | 665 |
| | AWS A5.28 E80C-G | | | | ≥550 |

(16) Impact test

| | | |
|---|---|---|
| Notch Type: Charpy V Notch | Specimen size: 10 mm * 10 mm | Test temperature: −40° C. |

| | Impact absorbed energy (J) | | | | | |
|---|---|---|---|---|---|---|
| Specimen Location | Single value | | | | | AVE. value |
| Weld metal center line | 36 | 28 | 30 | 30 | 35 | 31.8 |

In the present invention, AWS A5.28 and E80C-G are definded in 2007 *ASME Boiler & Pressure Vessel Code, II, Part C, Specifications for Welding Rods, Electrodes, and Riller Metals*, 2007 Edition, Jul. 1, 2007.

The inventors of the present invention noticed the content percentage in different types of low-alloy high strength steels as shown in Table 9:

TABLE 9

| Steel | Grade | C ≤, % | Mn % | Si ≤, % | P ≤, % | S ≤, % | V % | Nb % | Ti % | Al ≥, % | Cr ≤, % | Ni ≤, % |
|---|---|---|---|---|---|---|---|---|---|---|---|---|
| Q345 | A | 0.20 | 1.00~1.60 | 0.55 | 0.045 | 0.045 | 0.02~0.15 | 0.015~0.060 | 0.02~0.20 | — | — | — |
|  | B |  |  |  | 0.040 | 0.040 |  |  |  | — | — | — |
|  | C |  |  |  | 0.035 | 0.035 |  |  |  | 0.015 | — | — |
|  | D | 0.18 |  |  | 0.030 | 0.030 |  |  |  | 0.015 | — | — |
|  | E |  |  |  | 0.025 | 0.025 |  |  |  | 0.015 | — | — |
| Q390 | A | 0.20 | 1.00~1.60 | 0.55 | 0.045 | 0.045 | 0.02~0.20 | 0.015~0.060 | 0.02~0.20 | — | 0.30 | 0.70 |
|  | B |  |  |  | 0.040 | 0.040 |  |  |  | — | 0.30 | 0.70 |
|  | C |  |  |  | 0.035 | 0.035 |  |  |  | 0.015 | 0.30 | 0.70 |
|  | D |  |  |  | 0.030 | 0.030 |  |  |  | 0.015 | 0.30 | 0.70 |
|  | E |  |  |  | 0.025 | 0.025 |  |  |  | 0.015 | 0.30 | 0.70 |
| Q420 | A | 0.20 | 1.00~1.70 | 0.55 | 0.045 | 0.045 | 0.02~0.20 | 0.015~0.060 | 0.02~0.20 | — | 0.40 | 0.70 |
|  | B |  |  |  | 0.040 | 0.040 |  |  |  | — | 0.40 | 0.70 |
|  | C |  |  |  | 0.035 | 0.035 |  |  |  | 0.015 | 0.40 | 0.70 |
|  | D |  |  |  | 0.030 | 0.030 |  |  |  | 0.015 | 0.40 | 0.70 |
|  | E |  |  |  | 0.025 | 0.025 |  |  |  | 0.015 | 0.40 | 0.70 |
| Q460 | C | 0.20 | 1.00~1.70 | 0.55 | 0.035 | 0.035 | 0.02~0.20 | 0.015~0.060 | 0.02~0.20 | 0.015 | 0.70 | 0.70 |
|  | D |  |  |  | 0.030 | 0.030 |  |  |  | 0.015 | 0.70 | 0.70 |
|  | E |  |  |  | 0.025 | 0.025 |  |  |  | 0.015 | 0.70 | 0.70 |

The inventors of the present invention also noticed the property parameters for different types of low-alloy high strength steels as shown in Table 10:

TABLE 10

| Steel | Grade | YS $\sigma_s$, ≥, (Mpa) Thickness or diameter, mm | | | | TS, $\sigma_b$ (Mpa) | EL %, ≥ | Impact value (horizontal), ≥, J | | | |
|---|---|---|---|---|---|---|---|---|---|---|---|
|  |  | ≤16 | >16~35 | >35~50 | >50~100 |  |  | +20° C. | 0° C. | −20° C. | −40° C. |
| Q345 | A | 345 | 325 | 295 | 275 | 470~630 | 21 |  |  |  |  |
|  | B |  |  |  |  |  | 21 | 34 |  |  |  |
|  | C |  |  |  |  |  | 22 |  | 34 |  |  |
|  | D |  |  |  |  |  | 22 |  |  | 34 |  |
|  | E |  |  |  |  |  | 22 |  |  |  | 27 |
| Q390 | A | 390 | 370 | 350 | 330 | 490~650 | 19 |  |  |  |  |
|  | B |  |  |  |  |  | 19 | 34 |  |  |  |
|  | C |  |  |  |  |  | 20 |  | 34 |  |  |
|  | D |  |  |  |  |  | 20 |  |  | 34 |  |
|  | E |  |  |  |  |  | 20 |  |  |  | 27 |
| Q420 | A | 420 | 400 | 380 | 360 | 520~680 | 18 |  |  |  |  |
|  | B |  |  |  |  |  | 18 | 34 |  |  |  |
|  | C |  |  |  |  |  | 19 |  | 34 |  |  |
|  | D |  |  |  |  |  | 19 |  |  | 34 |  |
|  | E |  |  |  |  |  | 19 |  |  |  | 27 |
| Q460 | C | 460 | 440 | 420 | 400 | 550~720 | 17 |  | 34 |  |  |
|  | D |  |  |  |  |  | 17 |  |  | 34 |  |
|  | E |  |  |  |  |  | 17 |  |  |  | 27 |

It can be seen, by comparing Table 10 with Table 4, Table 6, Table 7 and Table 8, that all parameters including the yield strength, the tension strength, the elongation and the impact value of the flux-cored welding wires in the present invention are suitable to weld Q345, Q390, Q420 and Q460 low-alloy high-strength steels.

Through experiments, it is found that the flux composition is selected to have achieved two functions. One achieved function is to greatly reduce the slags at the welding beads. After completing the welding process, some of the slags automatically detach from the welding beads (or welding seams), and the remaining slags loosely bond on the welding beads (or welding seams) so that they can be easily cleaned. The other achieved function is to form smooth and shining surfaces on the welding beads (or welding seams) after cleaning. Consequently, the slag cleaning before galvanization is much easier and fewer dusts are generated in the working environment, thus being beneficial for environment and to sanitation.

Figure 7:
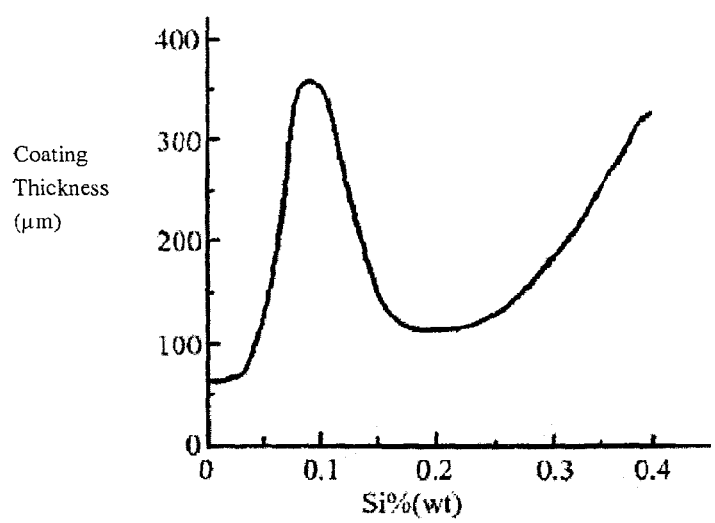
FIG. 7 illustrates the corresponding relationship between the silicon amount and the thickness of the zinc coating layer.

According to the Sandelin effect, when using hot-dip zinc galvanizing process, the thickness of the zinc layer has a corresponding relationship with the silicon amount in the steel. As shown in FIG. 7 (see the article of *Interpretation Model of Sandelin Effect Mechanism in Hot Dip Galvanization in Materials Protection*, published in August 2004, Vol. 37, No. 8, P 26, written by C H E Chun-shan, L U Jin-tang, etc.), when the hot dip galvanizing process is used to coat zinc, the amount of silicon content has great effect to the thickness of the zinc coating. When the amount of silicon is too high or too low, the thickness of the zinc coating is excessively thick. Through observation and experiment, the inventors noticed when the amount of silicon is between 0.1%-0.4% by weight in the steel material, the thickness of the zinc coating is proper. When galvanizing zinc on the surfaces of the steel and the deposited metal for constructing electric towers, the zinc coating layer on surfaces of the steel and the deposited metal shall not be too thick. This is so because if the zinc coating layer is too thick, it is easy to come off. Without the protection from the zinc coating layer, the steel and the welding beads (or welding seams) are susceptible to the corrosion caused by the outside environment. Thus, to ensure the best quality of the zinc coating, the first aspect is to form proper thickness of the zinc coating; and the second aspect is to make the zinc coating thickness on welding bead or welding seam (i.e., the surface of the deposited metal) equal or similar to that on the adjacent steel. For that reason, the silicon amount in the deposited metal by weight should be equal or similar to that in the adjacent steel. When the silicon amount in the deposited metal by weight is equal or similar to that in the adjacent steel, the zinc coating thickness on the welding bead will be equal or similar to that on the adjacent steel. In the standard specification for Q345, Q390, Q420 and Q460 steels as shown in Table 5, the silicon is 0.55% or less by weight. In real production, however, low-alloy high-strength steels may have some deviations from the standard specification. For example, in real production the silicon amount in Q420 steel is usually 0.3%-0.4%. According to the sprits of the present invention, the silicon amount in the flux may need to be adjusted to fit the silicon amount in a specific low-alloy high-strength steel in real production.

Through experiments, it is found that the other achieved function of the composition selection in the flux is after welding, the silicon amount by weight in the deposited metal is equal or similar to that in low-alloy high strength steels (such as Q345, Q390, Q420 and Q460 steels). Therefore, the welding wires in the present invention can not only improve the zinc galvanization at welding bead, it can also ensure that the zinc coating thickness at the welding bead is equal or similar to that at the adjacent steel. For example, when welding the Q420 steel with the flux-cored welding wires of the present invention, the silicon content by weight in the deposited metal is 0.1%-0.4%, which is similar to that in Q420 steel.

Through experiments, it is found that the flux composition of the present invention is effective in cleaning the slags on the welding beads (or welding seams) of Q420 low-alloy high-strength steel and effective in zinc galvanization. The flux composition of the present invention is also effective to slag-cleaning and zinc galvanization for Q345, Q390 and Q460 low-alloy high-strength steels.

In the present invention, the surface of the zinc coating on the low-alloy high-strength steel forms a dense oxide (i.e. dense zinc-oxide) layer, which can prevent the inner zinc coating from being oxidized. Because the dense oxide layer is not susceptible to corrosion from the environment, it can protect the inner zinc coating, the steel and the deposited metal. Therefore, it can prevent the assembly components made from low-alloy high strength steels for electric tower from being corroded.

The zinc-coating in the present invention may use hot dip galvanizing process. The selection of zinc-coating process and zinc material is known to a person skilled in the art. In a same galvanizing process, the same zinc-coating material can be coated on the welding bead and the surface of the adjacent steel; no separate galvanizing process is needed.

The flux-cored welding wires of the present invention can clearly improve the construction of electric tower using low-alloy high-strength steels (such as Q345, Q390, Q420 and Q460 steel).

The following descriptions are the example of constructing the angel steel electric tower: The process of constructing a steel electric tower according to the present invention is as follows:

Step 1: Selecting steel strip 30 as shown in FIG. 3, which is used to form the welding wires to weld the assembly components (including tower base, angle steel, angle steel connector, steel pipe and steel pipe connector) made from low-alloy high-strength steels for constructing electric towers. In the present invention, the material of the steel strip is low-carbon steel.

Step 2: Forming the steel strip into U-shaped steel strip 30 with a U-shape groove as shown in FIG. 4 for receiving the flux produced according to the embodiments shown in Table 1 of the present invention.

Step 3: Enclosing the opening of the U-shaped groove as shown in FIG. 5 to wrap the flux 31.

Step 4: Pulling the enclosed steel strip 30 by a drawing machine to form a round-shaped welding wire 60 as shown in FIG. 5, in which the flux is contained in the middle portion of the welding wire 60 as shown in FIG. 6A. In one embodiment of the present invention, the diameter of the flux-cored welding wire is 1.4 mm. In other embodiments of the present invention, the diameter of the flux-cored welding flux can be 1.6 mm or, 1.2 mm.

FIG. 6B is a sectional view of the welding wire after being drawn to form round shape according to the present invention. The flux 31 is wrapped in the middle portion of the welding wires. The cross-section of the welding wire has an overlapped joint section 32.

Step 5: Using the welding wires of the present invention to weld the assembly components made from low-alloy high-strength steels as shown in FIG. 1A, FIG. 1B and FIG. 2 for constructing electric towers. After the welding process, most of the slags on the welding beads (or welding seams) are detached automatically and the remaining slags are loosely bonded on the welding beads (or welding seams). In addition, the welding process of the present invention enables the percentage amount of the silicon by weight in the welding beads (or welding seams) is equal or similar to that in the adjacent steel so as to facilitate galvanizing a zinc layer over the welding beads and the adjacent steel.

Step 6: Cleaning the slags on the welding beads (or welding seams) on the assembly components and galvanizing a zinc layer on the assembly components. After being galvanized with a zinc layer, the assembly components are used to construct electric towers in the filed.

The embodiments of the present invention are only intended to describe the invention but not to limit it. It is to be understood that many modifications and changes will occur to those skilled in the art and the appended claims are intended to cover all such modifications and changes as fall within the true spirit of the invention. For example, in addition to be used in constructing electric tower, the present invention can also be used in any other situations where components are made from low-alloy high-strength steels by using welding process and are required to galvanize a zinc layer over them before being assembled or installed.

The invention claimed is:

1. A welding wire, comprising:
   an enclosed round-shaped shell including a joint and having a hollow section; and
   the hollow section accommodating flux containing a composition including: Mn: 5%-20%; Si: 5%-15%; $TiO_2$: 5%-18%; $SiO_2$: 0.1%-10%; Mo: 0.1%-5% by weight; the remaining is iron.

2. The welding wire of claim 1, wherein:
the flux also includes Mg: 1%-5%; Al: 1%-5% by weight.

3. The welding wire of claim 1, wherein:
the shell of welding wire is low-carbon steel.

4. The welding wire of claim 3, wherein:
the weight of the flux is 10%-25% of the weight of the welding wire.

5. The welding wire of claim 1, wherein:
the welding wire is used to weld high-strength steel.

6. The welding wire of claim 1, wherein:
the welding wire is used in gas shielded arc welding.

7. The welding wire of claim 1, wherein:
the shell is made of steel.

8. The welding wire of claim 1, wherein:
the shell is a strip of metal wrapped about the flux.

9. The welding wire of claim 1, wherein the composition includes Mo: 1.5%-5% by weight.

10. A welding wire, comprising:
an enclosed round-shaped shell having a hollow section; wherein
the hollow section of the welding wire accommodating flux comprising: Mn: 5%-20%; Si: 5%-15%; $TiO_2$: 5%-18%; $SiO_2$: 0.1%-10%; Mo: 1.5%-5% by weight the remaining is iron,
wherein the flux is configured to facilitate cleaning welding slags on welding beads of low-alloy high-strength steel and facilitating galvanizing a protection layer on the welding beads and the low-alloy high-strength steel; and
the welding wire is configured for welding low-alloy high-strength steel via the creation of the welding beads on adjacent steel components welded together, the surface of the welding beads and the adjacent steel components being configured to be galvanized with the protection layer that can form a dense oxide.

11. The welding wire of claim 10, wherein:
the material of the shell of the welding wire is low-carbon steel.

12. The welding wire of claim 11, wherein:
the weight of said flux is 10%-25% of the weight of the welding wire.

13. The welding wire of claim 10, wherein:
the flux has a composition including: Mn: 5%-15% by weight.

14. The welding wire of claim 13, wherein:
the flux also includes: Mg: 1%-5%; Al: 1%-5% by weight.

15. The welding wire of claim 10, wherein the low-alloy high-strength steel is Q345, Q390, Q420 or Q460 steel.

16. The welding wire of claim 10, wherein:
the welding beads formed in a welding process by using the welding wire is suitable for coating the protection layer, and
the protection layer is a zinc layer, and deposited metal at the welding beads includes silicon by weight to facilitate galvanizing the zinc protection layer on the welding beads.

17. The welding wire of claim 16, wherein:
the welding bead includes 0.1%-0.4% silicon by weight.

18. The welding wire of claim 17, wherein:
the welding wire in gas shielded arc welding.

19. The welding wire of claim 10, wherein:
the shell is a monolithic elongate structure extending about the hollow section and having a lap joint section joining lateral ends of the monolithic structure together.

20. A welding wire for welding assembly components made from low-alloy high-strength steel for constructing an electric tower, wherein the assembly components need to be galvanized with a protection layer that can form dense oxide, comprising:
an enclosed round-shaped shell having a hollow section;
wherein the hollow section accommodates flux comprising: Mn: 5%-20%; Si: 5%-15%; $TiO_2$: 5%-18%; $SiO_2$: 0.1%-10%; Mo: 1.5%-5% by weight the remaining is iron,
wherein the flux is configured to clean welding slags and to galvanize the protection layer on welding beads on the assembly components for constructing the electric tower.

21. The welding wire of claim 20, wherein:
the material of the shell is low-carbon steel.

22. The welding wire of claim 21, wherein:
the weight of the flux is 10%-25% of the weight of the welding wire.

23. The welding wire of claim 20, wherein:
the flux has a composition by weight including: Mn: 5%-15% by weight.

24. The welding wire of claim 23, wherein:
the flux also includes Mg: 1%-5%; Al: 1%-5% by weight.

25. The welding wire of claim 20, wherein:
the low-alloy high-strength steel is Q345, Q390, Q420 or Q460 steel.

26. The welding wire of claim 20, wherein:
the welding beads are suitable for coating the protection layer that can form the dense oxide; and
the protection layer is a layer of zinc, and deposited material at the welding beads contains silicon for facilitating galvanizing the protection layer.

27. The welding wire of claim 26, wherein:
the welding bead contains 0.1%-0.4% silicon by weight.

28. The welding wire of claim 26, wherein:
the welding wire is used in gas shielded arc welding.

29. The welding wire of claim 20, wherein the welding wire is configured for welding the assembly components made from low-alloy high-strength steel for constructing the electric tower, wherein the assembly components need to be galvanized with the protection layer that can form dense oxide.

30. A method for constructing an electric tower that is assembled by assembly components made from low-alloy high-strength steel, wherein the assembly components need to be galvanized with a zinc protection layer that can form dense oxide, comprising the steps of:
providing a welding wire for welding the assembly components, wherein the welding wire comprises an enclosed round-shaped shell made from low-carbon steel, wherein the shell has a hollow section for accommodating flux comprising: Mn: 5%-20%; Si: 5%-15%; $TiO_2$: 5%-18%; $SiO_2$: 0.1%-10%; Mo: 1.5%-5% by weight the remaining is iron,
wherein the flux is configured to facilitate cleaning slags on welding beads of the assembly components and to facilitate galvanizing a zinc layer on the welding beads and the adjacent steel of the assembly components;
using the welding wire to weld the assembly components made from low-alloy high-strength steel;
cleaning the slags on the welding beads in the assembly components and galvanizing a zinc layer on the assembly components; and
constructing the assembly components into the electric tower in the field.

31. The method of claim 30, wherein:
the material of the shell is low-carbon steel.

32. The method of claim 31, wherein:
the weight of the flux is 10%-25% of the weight of the welding wire.

33. The method of claim 30, wherein:
the flux has a composition including: Mn: 5%-15% by weight.

34. The method of claim 33, wherein:
the flux composition also includes Mg: 1%-5%; Al: 1%-5% by weight.

35. The method of claim 30, wherein:
the low-alloy high-strength steel is Q345, Q390, Q420 or Q460 steel.

36. The method of claim 30, wherein:
the welding step is performed in gas shielded arc welding.

37. The method of claim 30, wherein:
the welding beads resulting from the method have a chemical composition (wt %) of C: 0.047-0.064; Mn: 1.01-1.67; Si 0.197-0.4; Mo: 0.224-0.286; Ni: 0.01-0.025; S: 0.005-0.013; P: 0.009-0.016 and Ti: 0.003-0.053.

38. The method of claim 30, wherein the action of providing the welding wire comprises:
obtaining a steel strip comprising low-carbon steel;
forming the obtained steel strip into a U-shaped steel strip with a U-shape groove;
enclosing an opening of the U-shaped groove, thereby wrapping the flux in the obtained steel strip; and
pulling the encloses steel strip by a drawing machine to form the welding wire such that the welding wire is round in shape and such that the flux is contained in the middle portion of the welding wire.

39. The method of claim 30, wherein a silicon amount in a deposited metal deposited during the welding, by weight, is about equal to that in the components made from low-alloy high-strength steel.

40. The method of claim 30, wherein the welding wire is used to weld the assembly components made from low-alloy high-strength steel indoors.

41. The method of claim 30, wherein the action of using the welding wire to weld the assembly components made from low-alloy high-strength steel is executed indoors.

42. A welding wire, comprising:
an enclosed round-shaped shell having a hollow section; and
the hollow section accommodating flux comprising: Mn: 5%-20%; Si: 5%-15%;
$TiO_2$: 5%-18%; $SiO_2$: 0.1%-10%; Mo: 1.5%-5% by weight the remaining is iron.

* * * * *